United States Patent Office

Re. 25,835
Reissued Aug. 10, 1965

25,835

ALKYL AND HALOALKYL 3,4-DICHLORO-BENZYL CARBONATE ESTERS

Robert M. Schisla, Kirkwood, and Van R. Gaertner, Ballwin, Mo., assignors to Monsanto Company, a corporation of Delaware No Drawing. Original No. 3,124,608, dated Mar. 10, 1964, Ser. No. 70,923, Nov. 22, 1960. Application for reissue July 9, 1964, Ser. No. 395,971
7 Claims. (Cl. 260—463)

Matter enclosed in heavy brackets [ ] appears in the original patent but forms no part of this reissue specification; matter printed in italics indicates the additions made by reissue.

This invention relates in general to biologically active materials, and the preparation thereof, as well as with biological toxicant compositions which contain such materials, and with the use thereof for controlling biological pests.

It is an object of this invention to provide new biologically active organic carbonate compounds. Another object of this invention is to provide alkyl and haloalkyl chlorobenzyl carbonates as new compounds. Another object of this invention is to provide methods for reacting alkyl and haloalkyl chloroformates with chloro-substituted benzyl alcohol. It is another object of this invention to provide biological toxicant compositions containing at least one alkyl or haloalkyl chloro-substituted benzyl carbonate as an essential active ingredient. It is a further object of this invention to provide methods for controlling biological pests by the application of a biological toxicant composition containing at least one of the alkyl or haloalkyl chloro-substituted benzyl carbonate compounds. Other aspects, objects and advantages of this invention are apparent from a consideration of the accompanying disclosure and the appended claims.

According to the invention, the new biologically active compounds are prepared by the reaction of an alkyl or haloalkyl haloformate with a chloro-substituted benzyl alcohol substantially according to the scheme:

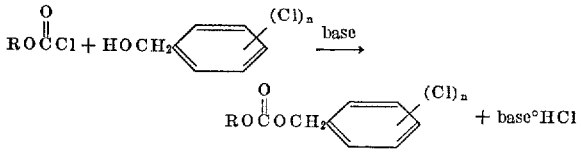

wherein R is selected from the group consisting of alkyl and haloalkyl radicals having from 1 to 8 carbon atoms, and n is a whole number of from 1 to 5.

Thus, the present invention provides new compounds of the formula

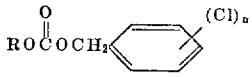

wherein R and n are as defined above.

Further, according to the present invention, there are provided biological toxicant compositions containing a carrier adjuvant and as an essential active ingredient, a toxic amount of at least one of the above defined alkyl or haloalkyl chloro-substituted benzyl carbonate compounds.

Further, according to the present invention, there are provided methods for controlling biological pests by the application of said above defined biological toxicant compositions.

The alkyl and haloalkyl haloformate compounds useful for the present purpose include: methyl, ethyl, n-propyl, iso-propyl, tert-butyl, n-butyl, tert-pentyl, n-pentyl, n-hexyl, n-heptyl, 2-ethylhexyl, and octyl chloro- and bromoformates, as well as haloalkyl haloformates such as 2-chloroethyl, 2-bromopropyl, 2-chlorobutyl, 3-chloropentyl, 4-bromohexyl, and 3-chlorooctyl chloro- and bromoformates. The chloroformates are preferred for reasons of availability and favorable cost.

As examples of chloro-substituted benzyl alcohols which are reacted with the alkyl and haloalkyl haloformates according to the invention to give the present organic carbonate compounds may be mentioned the following: 2-chlorobenzyl, 4-chlorobenzyl, 3,4-dichlorobenzyl, 2,4,5-trichlorobenzyl, tetrachlorobenzyl, and pentachlorobenzyl alcohols.

The present organic carbonate compounds are well defined liquid to waxy or even crystalline compounds which are generally soluble in ether and in acetone but which are insoluble in water. As will be shown hereinafter, the present organic carbonate compounds are characterized by high biological toxicant activity. This effect is demonstrated when they are present in treating solutions in very small concentrations, for example, in quantities of as low as from 10 to 200 parts per million.

The reaction of the alkyl and haloalkyl haloformates with the chloro-substituted benzyl alcohol compounds is exothermic so that this reaction is normally conducted in an inert solvent medium under carefully controlled temperature conditions. In general, a temperature within the range of from 0 to 20° C. is used and preferably the temperature is maintained within the range of from 0 to 10° C. at atmospheric pressure. The solvent used is preferably one in which the chloro-substituted benzyl alcohol is soluble and one which functions as a basic acid acceptor material, for instance, a tertiary amine solvent such as pyridine, N,N-dimethylaniline, etc.; however, other solvents such as benzene, toluene, hexane, and the like, can also be used providing that at least a stoichiometric amount of the basic acid acceptor material is also present.

The reaction of the invention is normally conducted by either dissolving or suspending the chloro-substituted benzyl alcohol in a suitable solvent, for example, pyridine, and adding the alkyl or haloalkyl haloformate reactant slowly under constant agitation and carefully controlled temperature conditions involving removal of the exothermic heat of reaction. The completion of the reaction can be readily determined by observing the amount of hydrogen halide by-product which is taken up by the base, or by the cessation of a slight temperature rise upon continued addition of haloformate reactant.

Illustrative examples of the alkyl chloro-substituted benzyl carbonate compounds obtained as product using alkyl haloformate reactants are as follows: methyl, ethyl, n-propyl, iso-propyl, tert-butyl, n-butyl, tert-pentyl, n-pentyl, n-hexyl, 2,4-dimethylheptyl, 2-ethylhexyl, and octyl 2,4-dichlorobenzyl carbonates, ethyl pentachlorobenzyl carbonate, nonyl and butyl tetrachlorobenzyl carbonates, n-hexyl 2,4,5-trichlorobenzyl carbonate, and 2-ethylhexyl 4-chlorobenzyl carbonate.

Illustrative examples of haloalkyl chloro-substituted benzyl carbonate compounds obtained as products using haloalkyl haloformate reactant are as follows: 2-chloroethyl 2,4-dichlorobenzyl carbonate, 2-bromopropyl 2,4,5-trichlorobenzyl carbonate, 3-chloropentyl tetrachlorobenzyl carbonate, and 3-chloroheptyl pentachlorobenzyl carbonate.

The advantages, desirability, and usefulness of the new compounds of this invention are illustrated by the following examples:

EXAMPLE 1

To a solution of 35.4 g. (0.2 mole) of 3,4-dichlorobenzyl alcohol in 600 ml. of pyridine, cooled to keep the temperature below 20° C., there was slowly added 50.0 g. (0.46 mole) of ethyl chloroformate. The mixture was stirred for 18 hours. The pyridine solvent was removed using vacuum and mild heating (pot temperature never higher than 50° C.). The residue was hydrolyzed with 600 ml. of water, and then washed with excess ether. The ether solution was dried over sodium sulfate and magnesium sulfate, and filtered. The ether solvent was distilled off under reduced pressure, and the residue was distilled under vacuum to obtain 44.2 g. of crude ethyl 3,4-dichlorobenzyl carbonate, which was redistilled to obtain a pure product, B.P. 110–111° C./0.2 mm. and which was analyzed as containing 28.45% chlorine as compared to 28.46% chlorine, the calculated value.

EXAMPLE 2

To a solution of 30.6 g. (0.173 mole) of 3,4-dichlorobenzyl alcohol in 600 ml. of pyridine there was added dropwise 33.8 g. (0.248 mole) of n-butyl chloroformate while cooling the mixture to keep the temperature below 20° C. When the addition was completed, the mixture was stirred for 18 hours, and then hydrolyzed by adding 600 ml. of water. This reaction mixture was washed several times with ether. The ether extracts were combined and dried with a drying agent to remove water, and filtered. The ether solvent was removed under reduced pressure and mild heating. The residue was distilled to obtain 44.0 g. of crude butyl 3,4-dichlorobenzyl carbonate. Redistillation gave 35.5 g. of pure product, B.P. 132–133° C./0.5 mm. which was analyzed as containing 25.58% chlorine as compared to 25.58%, the calculated value.

EXAMPLE 3

The procedure of Example 2 was repeated using 35.4 g. (0.2 mole) of 3,4-dichlorobenzyl alcohol in 600 ml. of pyridine and 42.8 g. (0.26 mole) of n-hexyl chloroformate. There was obtained 52.3 g. of crude product, B.P. 141–145° C./0.2–0.3 mm., which was redistilled to obtain 41.0 g. of pure n-hexyl 3,4-dichlorobenzyl carbonate, B.P. 146–147° C./0.4 mm.

EXAMPLE 4

The procedure of Example 2 was again repeated using 35.4 g. (0.2 mole) of 3,4-dichlorobenzyl alcohol in 600 ml. of pyridine with 600 g. (0.42 mole) of 2-chloroethyl chloroformate. In this example, excess pyridine was removed by heating mildly under vacuum (3–4 mm.) to avoid quaternary salt formation. There was obtained 50.1 g. of crude product, B.P. 136–157° C./0.45–0.9 mm., which was redistilled to obtain 42.0 g. of pure 2-chloroethyl 3,4-dichlorobenzyl carbonate, B.P. 147–149° C./0.2 mm., which was analyzed as containing 37.46% chlorine as compared to 37.51% chlorine, the calculated value.

EXAMPLE 5

This example shows evaluation of the ethyl [2,4-dichlorobenzyl] *3,4-dichlorobenzyl* carbonate as a foliage protectant.

An aliquot of a 1% acetone solution of the ethyl [2,4-dichlorobenzyl] *3,4-dichlorobenzyl* carbonate was pipetted into a vial of an atomizer, there was then added 0.1 ml. of a dispersing agent known to the trade as "Tween 20" (a polyoxyalkylene derivative of sorbitan monolaurate), and the volume of liquid was brought up to 10 ml. by addition of water.

Cucumber plants (Green Prolific) with a first leaf the size of a 50-cent piece were sprayed to runoff with the atomizer, which delivered 10 ml. per 45 seconds at 10 p.s.i. for each plant. This corresponded to the use of a spray containing 1250 parts of the salt per million parts of the carrier (equivalent to one pound of the salt per 100 gallons of the spray). The sprayed plants were then placed on the greenhouse bench and the spray which had been deposited thereon was allowed to dry. They were then placed in a moist chamber (100% humidity) at 70° F. and inoculated by spraying with a spor suspension of Colletotrichum lagenarium, a causal agent of cucumber anthracnose. The suspension employed contained 30,000 to 60,000 spores per ml.

After 36 hours in the moist chamber, the plants were moved to a greenhouse bench and kept there for 5 days. Observation of the plants at the end of that time were made by examining the leaves of the plants for lesions. No lesions had occurred on the plants which had been sprayed and inoculated as herein described. On the other hand, control tests in which the cucumber plants had not been sprayed with the present compound showed severe infection after being similarly inoculated with the Colletotrichum lagenarium.

EXAMPLE 6

In this example, 2-chloroethyl [2,4-dichlorobenzyl] *3,4-dichlorobenzyl* carbonate was tested as a pre-emergent herbicide.

Aluminum pans were level filled with a good grade of top soil which had been screened through a ¼" wire mesh. The soil surface was then compacted to a depth of ⅜" from the top of the pan. A pre-determined number of seeds each of morning glory, wild oat, brome grass, foxtail, crab grass, rye grass, radish, sugar beet, soybean, wild buckwheat, tomato, sorghum, and pigweed were then scattered on the soil surface and covered with soil to the pan top.

The planted pans, except for controls, were sprayed with an aliquot of an organic solvent containing 2-chloroethyl [2,4-dichlorobenzyl] *3,4-dichlorobenzyl* at a dilution equivalent to 25 pounds per acre. After spraying, the pans were placed on sand in a bench in the greenhouse and the bench flooded with water to ½" above the sand level. The test pans were allowed to absorb moisture through the perforated bottom until the surface was about ½ moist. The excess water was then drained off below the bench sand level. The surface of the test pans rapidly became completely moist by capillary action and was maintained adequately wet by sub-irrigation for the two week test period. The pans were observed after two weeks.

Observation of the pans at the end of that time disclosed that the sugar beet, foxtail, crab grass, pigweed, and tomato had been very severely affected since no seedlings of the plants had emerged, whereas the seeds of these plants in the untreated pan had germinated with the formation of healthy seedlings. The effect on brome grass, radish, wild buckwheat, and sorghum was moderate with few seedlings developed. There was no evidence of phytotoxicity with respect to wild oats and soybeans since the seedlings from these plants had emerged and were growing just as well as those in the untreated pan.

EXAMPLE 7

Butyl [2,4-dichlorobenzyl] *3,4-dichlorobenzyl* carbonate was tested as an insecticide against aquatic larvae, using the yellow fever mosquito, Aedes aegypti, as the test organism. In this test, early fourth instar yellow fever mosquito larvae are placed in a dilute aqueous solution or suspension of the test chemical, and observed for toxic action.

The test procedure used is as follows: culture tubes are rinsed with acetone to eliminate possible insecticide contamination and placed in a holding block. Each tube is filled with 70 cc. of dstilled water. Next, 0.1 cc. of the test chemical is dissolved in 10 ml. of acetone to make a 1% solution. Of this preparation, 0.07 ml. is pipetted into the culture tube containing the distilled water. The tube is then stoppered with an acetone-washed rubber stopper and shaken vigorously to facilitate complete mixing. Mosquito larvae are concentrated in a rearing container with the aid of a 60 watt light bulb. Approximately 25 larvae are transferred to each tube with the aid of a pipette. The larvae are held in the test solutions at room temperature for 24 hours at which time mortality observations are taken.

Using the above test procedure, it was found that the test chemical, butyl [2,4-dichlorobenzyl] *3,4-dichloro-*

*benzyl* carbonate, gave a 100% kill at 10 parts per million, whereas in a similar culture tube prepared as above, but not containing the test chemical, the larvae were living in a normal healthy state.

The pesticidal compositions of this invention can be either liquids or dusts containing the new compounds of this invention admixed with suitable liquid or finely-divided solid adjuvant carriers. These liquid or dust compositions can also contain, in addition to the regular adjuvants, other additaments, such as fertilizers, for particular applications.

Liquid compositions containing the desired amount of these novel alkyl or haloalkyl [2,4-di] chlorobenzyl carbonate compounds can be prepared by dissolving them in an organic solvent, such as dioxane, diethylcarbitol, or tetrahydrofuran. Although these compounds are substantially insoluble in water, liquid compositions can be made by dispersing a finely-divided alkyl or haloalkyl chloro-substituted benzyl carbonate using a suitable dispersing agent. Also, if desired, liquid compositions can be formed by dispersing the organic liquid compositions containing dissolved compound in water solutions to form an emulsion with the aid of a suitable dispersing or emulsifying agent. Dispersing agents employed in these compositions are oil soluble and include non-ionic emulsifiers such as the condensation products of alkylene oxide with phenols and organic acids, polyoxyethylene derivatives of sorbitan esters, complexed ether alcohols and the like. Ordinarily, the concentration of the alkyl or haloalkyl chloro-substituted benzyl carbonates in the liquid composition will comprise from 1 to 95% by weight of the total composition.

In dust compositions, the alkyl or haloalkyl chloro-substituted benzyl carbonate compound is dispersed in a finely-divided solid material such as talc, chalk, gypsum, fuller's earth, clay, and the like. The concentration of the compound toxicant in the dust composition can vary over a wide range and preferably comprises from 5 to 95% by weight of the total composition.

The pesticidal compositions of this invention are applied to the situs of the pest in a conventional manner well known to those skilled in the art. Thus, when the compositions are to be applied to the foliage of growing plants, dust or liquid compositions are applied by the use of power dusters, hand sprayers, and spray dusters. The exact dosage of toxicant to be applied depends to a substantial extent upon the nature of the pests to be controlled and their environment. Suitable dosages can be readily determined by those skilled in the art from the examples given herein.

Reasonable variation and modification of the invention as described are possible, the essence of which is that there have been provided (1) alkyl and haloalkyl chloro-substituted benzyl carbonates as new compounds, (2) methods for preparing the said compounds by reaction of an alkyl or haloalkyl haloformate with a chloro-substituted benzyl alcohol, (3) biological toxicant compositions containing at least one of said compounds as the essential active ingredient, and (4) method for controlling biological pests by the application of said biological toxicant compositions.

We claim:

1. A compound of the formula

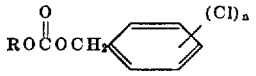

wherein R is selected from the group consisting of alkyl, chloroalkyl, and bromoalkyl radicals having from one to eight carbon atoms, and n is a whole number of from one to five.

2. A compound of the formula according to claim 1 wherein R is alkyl having from one to eight carbon atoms.

3. A compound according to the formula of claim 1 wherein R is a chloroalkyl radical having from one to eight carbon atoms.

[4. Ethyl 2,4-dichlorobenzyl carbonate.]

[5. Butyl 2,4-dichlorobenzyl carbonate.]

[6. Hexyl 2,4-dichlorobenzyl carbonate.]

[7. 2-chloroethyl 2,4-dichlorobenzyl carbonate.]

*8. Ethyl 3,4-dichlorobenzyl carbonate.*

*9. Butyl 3,4-dichlorobenzyl carbonate.*

*10. Hexyl 3,4-dichlorobenzyl carbonate.*

*11. 2-chloroethyl 3,4-dichlorobenzyl carbonate.*

References Cited by the Examiner

The following references, cited by the Examiner, are of record in the patented file of this patent or the original patent.

UNITED STATES PATENTS

| | | | |
|---|---|---|---|
| 2,510,025 | 5/50 | Moyle | 260—463 |
| 2,754,229 | 7/56 | Fredenburg et al. | 260—463 |
| 2,821,539 | 1/58 | Newman et al. | 260—463 |
| 2,873,291 | 2/59 | Spiegler | 260—463 |
| 2,992,159 | 7/61 | Kahn et al. | 167—30 |
| 2,992,966 | 7/61 | Jacobi et al. | 167—30 |

OTHER REFERENCES

Smith et al.: Ber. Deut. Chem., vol. 93, pp. 2400–4 (1960).

CHARLES B. PARKER, *Primary Examiner.*